US009423263B2

(12) United States Patent
Tuukkanen

(10) Patent No.: US 9,423,263 B2
(45) Date of Patent: Aug. 23, 2016

(54) METHOD AND APPARATUS FOR RECOMMENDING CONTENT BASED ON A TRAVEL ROUTE

(71) Applicant: NAVTEQ B.V., Veldhoven (NL)

(72) Inventor: Marko Tapio Tuukkanen, Schlenzer (DE)

(73) Assignee: HERE GLOBAL B.V., Veldhoven (NL)

(*) Notice: Subject to any disclaimer, the term of this patent is extended or adjusted under 35 U.S.C. 154(b) by 0 days.

(21) Appl. No.: 14/558,093

(22) Filed: Dec. 2, 2014

(65) Prior Publication Data

US 2015/0088423 A1 Mar. 26, 2015

Related U.S. Application Data

(63) Continuation of application No. 13/427,439, filed on Mar. 22, 2012, now Pat. No. 8,909,476.

(51) Int. Cl.

| G01C 21/00 | (2006.01) |
|---|---|
| G08G 1/123 | (2006.01) |
| G01C 21/36 | (2006.01) |
| G01C 21/26 | (2006.01) |
| H04W 4/02 | (2009.01) |
| G06F 3/0481 | (2013.01) |

(Continued)

(52) U.S. Cl.
CPC ............... *G01C 21/36* (2013.01); *G01C 21/26* (2013.01); *G06F 3/04817* (2013.01); *H04W 4/028* (2013.01); *H04W 4/008* (2013.01); *H04W 4/04* (2013.01)

(58) Field of Classification Search
CPC .................. G06Q 10/063116; G06Q 10/109; G06Q 10/1095; G06Q 10/1093; G06Q 50/06; G06Q 10/06316; G06Q 10/06; G06Q 10/083; G06Q 10/04; G06Q 30/02; G06Q 10/06313; G06Q 10/06314; G06Q 10/06315; G06Q 10/08355; G06Q 10/08

USPC ........................... 701/400–541; 340/988–996
See application file for complete search history.

(56) References Cited

U.S. PATENT DOCUMENTS

| 6,446,002 B1 | 9/2002 | Barton |
|---|---|---|
| 8,259,231 B2 | 9/2012 | Tsai |

(Continued)

FOREIGN PATENT DOCUMENTS

EP 2 077 435 A1 7/2009

OTHER PUBLICATIONS

International Search Report and Written Opinion for corresponding International Application No. PCT/EP2013/055333, dated Jun. 17, 2013, 10 pages.

*Primary Examiner* — Muhammad Shafi
(74) *Attorney, Agent, or Firm* — Ditthavong & Steiner, P.C.

(57) ABSTRACT

An approach for rendering one or more graphical elements associated with one or more content items recommended for consumption during travel based on travel times associated with one or more travel routes is described. A content item recommendation platform determines travel times associated with travel routes. The content item recommendation platform determines content recommendations, content items, or a combination thereof based, at least in part, on a comparison of the travel times and duration times associated with the content recommendations, the one or more content items, or a combination thereof. The content item recommendation platform further causes, at least in part, a rendering of a user interface depicting one or more icons, one or more markers, one or more graphical elements, or a combination thereof associated with the content recommendations, the content items, or a combination thereof along the travel routes based, at least in part, on the comparison.

10 Claims, 13 Drawing Sheets

(51) Int. Cl.
*H04W 4/04* (2009.01)
*H04W 4/00* (2009.01)

(56) References Cited

U.S. PATENT DOCUMENTS

2006/0116965 A1 6/2006 Kudo et al.
2008/0228385 A1 9/2008 Geelen
2008/0319648 A1* 12/2008 Poltorak .............. G08G 1/0969
  701/423
2010/0186025 A1 7/2010 Thomas et al.
2011/0060495 A1 3/2011 Kono et al.
2011/0320471 A1 12/2011 Hiroi et al.
2014/0358425 A1* 12/2014 Seth ................... G01C 21/3697
  701/438

* cited by examiner

100

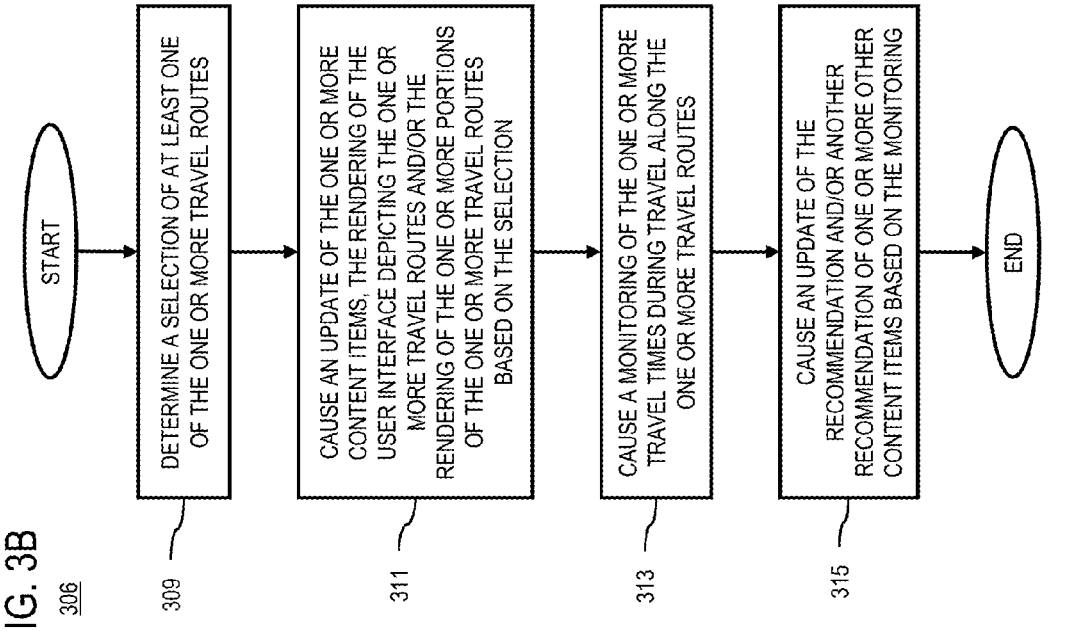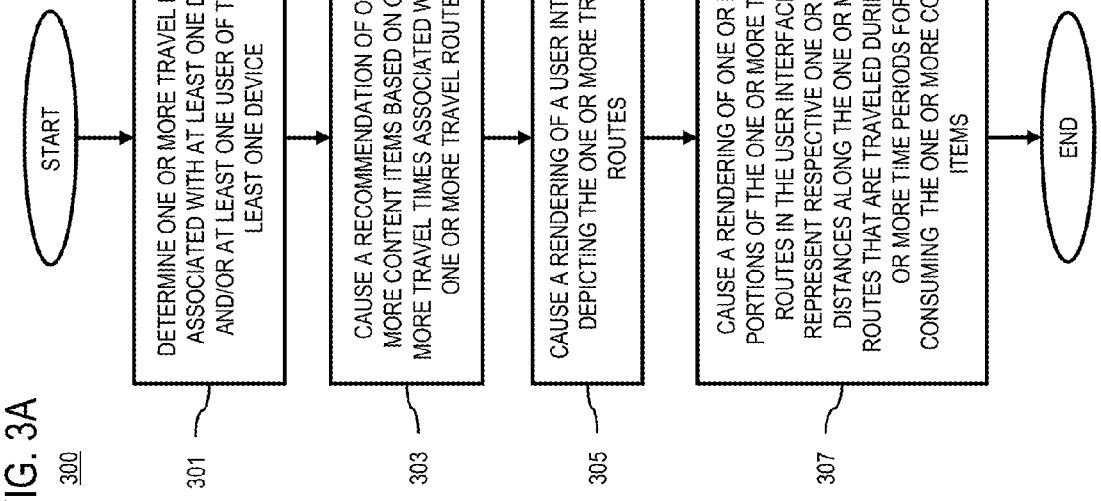

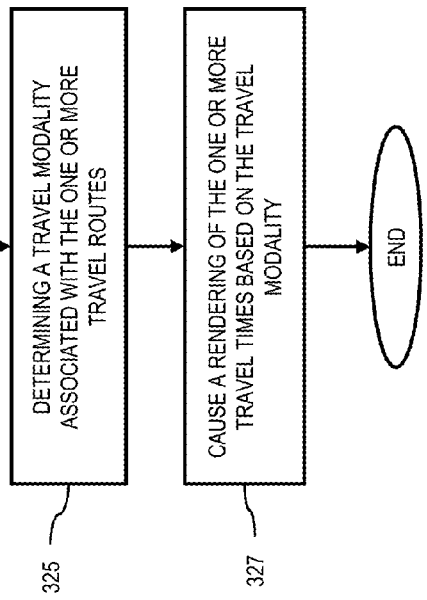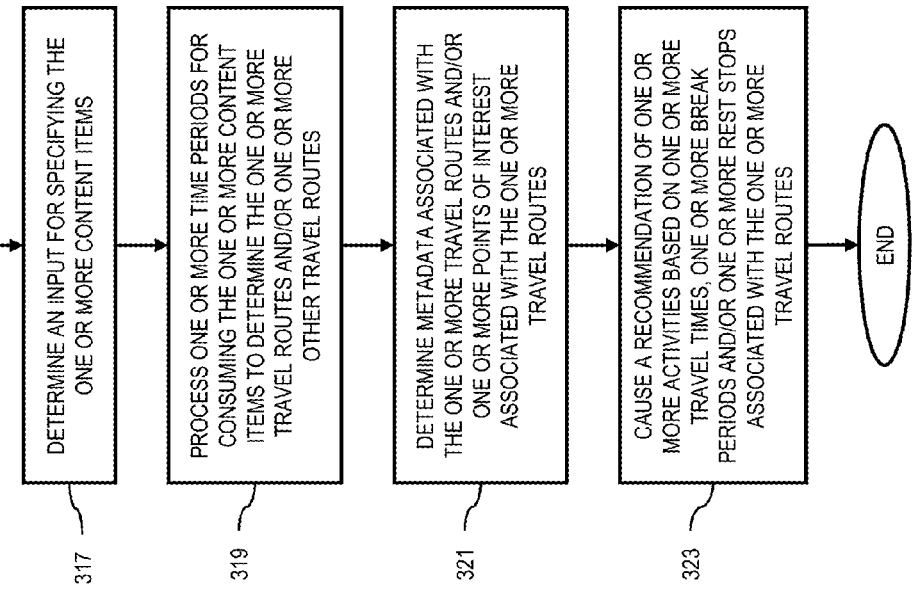

METHOD AND APPARATUS FOR RECOMMENDING CONTENT BASED ON A TRAVEL ROUTE

RELATED APPLICATION

This application is a continuation of U.S. application Ser. No. 13/427,439, titled "Method and Apparatus For Recommending Content Based On A Travel Route," filed on Mar. 22, 2012, the entirety of which is incorporated herein by reference.

BACKGROUND

Service providers and device manufacturers (e.g., wireless, cellular, etc.) are continually challenged to deliver value and convenience to consumers by, for example, providing compelling route planning applications and services. For example, device users often consume content items such as movies, music, multimedia and books as they travel along a given route. Typically, the content items are manually selected by the user and depending on their size and/or duration, may or may not be enjoyed in full within the time required to reach a destination along the travel route. Unfortunately, there is currently no convenient means for enabling a user to dynamically identify and select content items best suited for consumption along a travel route based on the approximate time required to reach a travel destination.

SOME EXAMPLE EMBODIMENTS

Therefore, there is a need for an approach for recommending one or more content items for consumption during travel based on one or more travel times associated with one or more travel routes.

According to one embodiment, a method comprises determining one or more travel routes associated with at least one device, at least one user of the at least one device, or a combination thereof. The method further comprises causing, at least in part, a recommendation of one or more content items based, at least in part, on one or more travel times associated with the one or more travel routes.

According to another embodiment, an apparatus comprises at least one processor, and at least one memory including computer program code for one or more computer programs, the at least one memory and the computer program code configured to, with the at least one processor, cause, at least in part, the apparatus to determine one or more travel routes associated with at least one device, at least one user of the at least one device, or a combination thereof. The apparatus is further caused to cause, at least in part, a recommendation of one or more content items based, at least in part, on one or more travel times associated with the one or more travel routes.

According to another embodiment, a computer-readable storage medium carries one or more sequences of one or more instructions which, when executed by one or more processors, cause, at least in part, an apparatus to determine one or more travel routes associated with at least one device, at least one user of the at least one device, or a combination thereof. The apparatus is further caused, at least in part, a recommendation of one or more content items based, at least in part, on one or more travel times associated with the one or more travel routes.

According to another embodiment, an apparatus comprises means for determining one or more travel routes associated with at least one device, at least one user of the at least one device, or a combination thereof. The apparatus further comprises means for causing, at least in part, a recommendation of one or more content items based, at least in part, on one or more travel times associated with the one or more travel routes.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3D are flowcharts of a process for generating one or more travel routes based on experience information related to one or more users, according to various embodiments;

DESCRIPTION OF SOME EMBODIMENTS

Examples of a method, apparatus, and computer program for recommending one or more content items for consumption during travel based on one or more travel times associated with one or more travel routes are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to routing applications, it is contemplated the approach described herein may be used with any mapping application, destination planning service, location based system, or any other utility for generating routes, maps, travel directions and data regarding various travel routes. Still further, while various embodiments are described with respect to content items such as music or videos, it is contemplated the approach described herein may apply to any data capable of being executed by a computing device.

Figure 1:
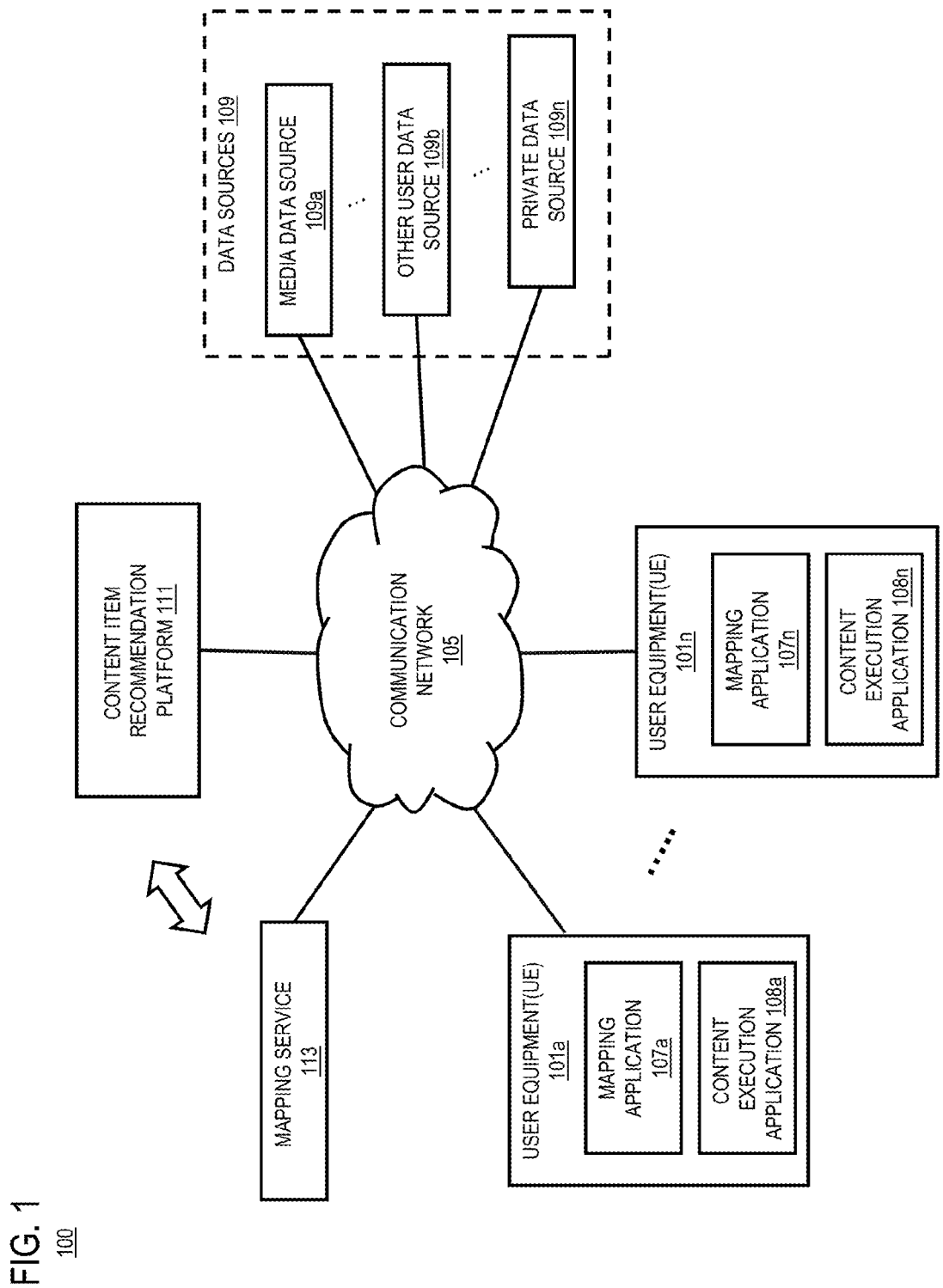
FIG. 1 is a diagram of a system capable of recommending one or more content items for consumption during travel based on one or more travel times associated with one or more travel routes, according to one embodiment.

FIG. 1 is a diagram of a system capable of recommending one or more content items for consumption during travel based on one or more travel times associated with one or more travel routes, according to one embodiment. By way of example, the system 100 enables content items such as music, videos, books, video games and other data of various formats to be recommended to a user for consumption via a device (e.g., a mobile device). For the purpose of illustration, the consumption of content items pertains to any means through which a device causes a rendering, playback, displaying, generating or other execution of data via a device for the benefit and/or enjoyment of a user. Consumption of one or more content items may be carried out by way of an application or service of the device, such as a media player, book reader, etc.

It is typical for travelers to employ laptop computers, tablets, smartphones and other mobile devices as they travel to retrieve local or network stored content items. In the latter case, the mobile device connects to a private, public or permission based data source that houses the various content items via a communication network; as initiated by way of a calling application or service. Resultantly, the user is able to consume content items even as they travel along a given route by car, bus, train or foot. Typically, the content items to be consumed during travel are manually selected by the user, such as from a playlist or directory. Depending on the size and duration, the selected content items may or may not able to be consumed in full within the time required to reach a destination along the travel route. Furthermore, changes in the travel route or travel conditions may further impact the time required to reach a destination and hence the amount of content required for consumption during travel.

Unfortunately, there is currently no convenient means for enabling a user to dynamically identify and select content items best suited for consumption along a travel route based on the approximate time required to reach a travel destination. Still further, there is currently no solution for enabling the rendering of one or more content item recommendations or content items concurrent with a mapping application.

To address this problem, a system 100 of FIG. 1 introduces the capability to generate recommendations—i.e., messages featuring individual content items or lists thereof—for selection by the user based on timing information. In addition, one or more activity recommendations and incentives may also be presented to the user for selection based on timing information pertaining to the travel route. The timing information may correspond to an amount of time required to reach a destination along a travel route generated by a mapping application, an amount of time remaining to reach a destination along a travel route generated by a mapping application, or a combination thereof. By way of example, the system 100 includes a content item recommendation platform 111 that operates in connection with the mapping service 113, respective mapping applications 107a-107n of user equipment (UE) 101a-101n respectively, or a combination thereof to facilitate rendering of the one or more recommendations to the user via their UE 101.

Under this approach, the content item recommendations or activity recommendations are rendered within a user interface of the mapping application 107a-107n in connection with routing information corresponding to one or more travel routes. Routing information may include, for example, directions, maps, images representative of various landmarks, waypoints, coordinates and other data for traversing a given geographical terrain from a point of origin to a destination point. The routing information may also include, based on a user selected level of granularity, an image or map representative of a general area, region or location.

In one embodiment, the content item recommendation platform 111 is configured to detect the generation of routing information, including one or more travel routes based on input provided by the user via the mapping application 107. The mapping application 107 may be a standalone application or widget operable at the UE 101 or alternatively a browser based application. The mapping application 107 may also operate in connection with a mapping service 113. By way of example, the mapping application 107 receives a request for routing information suggestive of one or more travel routes based on, or in connection with, one or more user inputs. The inputs include, for example, data for representing a point of origin, a final or intermediate destination, one or more points-of-interest (POI), a travel modality (e.g., car, public bus, pedestrian transport type), a travel condition (e.g., preferred arrival time, preferred road type), or other specified criteria. The mapping application 107 then transmits this input along with the request to the mapping service 113. This also triggers execution of the content item recommendation platform 111.

In response to the request, the content item recommendation platform 111 operates in connection with the service 113 to perform one or more of the following: (1) determine user selection of at least one of the travel routes generated by the mapping application; (2) identify an amount of time and/or distance required for the user to complete the travel route based on various factors including the user provided input, context information for the user (e.g., current travel speed), historical/average travel times, etc.; (3) persistently monitor the current or remaining travel time and/or distance traversed by the user along a travel route; (4) identify one or more data sources 109 for maintaining the one or more content items associated with a user of the UE 101; (5) identify one or more content items corresponding to the one or more data sources 109 that are capable of being consumed within the determined travel time associated with the one or more travel routes; (6) persistently monitor the consumption of one or more content items relative to a selected travel route, including the starting, stopping, discontinuing and full play (e.g., end point) of content consumption; and (7) cause the rendering and persistent updating of one or more recommendations of one or more content items relative to the determined monitoring of the travel times and/or distance traversed, the content consumed, or a combination thereof.

It is noted that the content item recommendation platform 111 may also cause generation and rendering of one or more activities recommendations for the user during travel along a given route based on the same above described processes. In the case of a content item or activity recommendation, a selected recommendation may be rendered at the device by way of a content execution application 108. The content execution application may include any application or service for processing, playing, displaying or otherwise enabling execution of the content items. In certain embodiments, the content execution application 108 may include, for example, a media player, a photo viewer, a book reader, a game platform, a word processor, an audio player, a podcast platform, a video player, or the like. It is further noted, similar to the mapping application 107, that the content execution application 108 may also be a browser based application.

The above described processes of the content item recommendation platform 111 are carried out to enable the mapping application 107 and/or mapping service 111 to associate optimal content items with a selected travel route; to support a contiguous, contextually relevant content consumption experience during travel. For example, the content item recommendation platform 111 automatically identifies content that is best suited for complete consumption by the user within the time required to reach a destination point associated with the travel route. As such, the user is prevented from having to manually select the appropriate content items. Still further, the content item recommendation platform 111 may automatically sequence multiple content items for execution and consumption during the travel route. Resultantly, the user needs not continually toggle between or initiate different content items as they are already queued for seamless execution or selection. Hence, the user experience with respect to the various content items available for download, stream, feed, transmission, exchange, or receipt by UE 101 is optimized relative to the characteristics, conditions and timing factors pertaining to a travel route.

In one embodiment, the one or more data sources 109 are repositories maintained by different entities or parties. As noted previously, the various data sources 109 can be accessed based on one or more established access and or security permissions, at the discretion and/or prompting of the user, etc. By way of example, the user of the mapping application 107 may serve as a host of a data source 109 by providing one or more photo albums or video libraries as content items. In this case, the user stores the data to a private data source 109n, including a social networking site, shared video collection or document repository. Album names, such as "Fun in Toronto" or "Party in Vegas" may also be established as metadata for associating the content items with known location information of the user. As another example, when the user wishes to watch a movie while traveling, the movie may be accessed from a cloud based service to which the user is subscribed. Under this scenario, instead of downloading the movie to a local device or accessing it from a dedicated media data source 109a, the user receives streaming content from their own network service (the cloud).

Similarly, other user data 109b can be provided by one or more other users or hosts, including images and videos, digital books and games. In addition, the various data sources 109b-109n may include a service maintained by a provider of a mapping service, push application service, exchange service, data feed or other content provider.

Still further, a content provider or media outlet may store media items 109a such as videos, music, books and images regarding various POIs corresponding to a given location. For example, a streaming movie service may be maintained for supporting UE 101 execution of movies. As another example, a representative of a given POI may also serve as a media data source 109a for providing incentives, promotions and other information related to activities to be performed by the user along a travel route. Under this scenario, a specific restaurant may provide one or more coupons for discounted food and beverages. The coupons may be maintained for a period of time corresponding to the specific duration of travel of the user, a date of travel or other expiry period. Of note, the coupons may also be retrieved in accordance with context information pertaining to the particular user to which a request for routing information is generated.

It is noted that the media outlet or content provider of data sources 109a may be a direct partner of the provider of the content item recommendation platform 111. In other instances, the data source 109a may be provided by a third-party designee (non-partner) subscribed with the service provider for making content item recommendations available to users. The content items and recommendations thereof provided by the various users, partners and designees enables users of UE 101 to better customize and retrieve relevant content items.

In addition, the data sources 109 may also specify one or more recommendations, reviews, feedback information, ratings or other indicators of satisfaction with respect to the one or more POI, incentives and offers, etc. For example, a satisfaction rating of "Superior" may be associated with a well liked restaurant while a "Terrible" rating is associated with a restaurant deemed to be of lesser quality. As such, the activity recommendation may appear more or less compelling to the user based on the rating. Regardless of the type of content item or activity information being retrieved, it is noted that the data sources 109 may be accessed by or referenced by the platform 111 in accordance with any known data mining and/or data exchange protocols, languages and network methodologies. In addition, the platform 111 may be integrated for use in connection with the mapping service 113 and/or mapping application 107 to permit the rendering of content item selections in connection with routing information corresponding to one or more travel routes. Still further, in certain embodiments, the mapping service 113 and platform 111 may be implemented as an integrated service. As such, the platform 111 and service 113 communicate with each other directly, without reliance upon the communication network 105, while facilitating interaction with the various UE 101a-101n via the network 105.

In one embodiment, the content item recommendation platform 111 also processes metadata associated with the one or more travel routes or points-of-interest along a given travel route. The metadata may include, for example, a tag for specifying a current location, name or identifier of a given point-of-interest and/or venue encountered by the user of UE 101 during travel. As another example, the metadata may include timestamp information for indicating a current date and time associated with a picture of a given point-of-interest. It is noted that the metadata may pertain to any contextual data, including location data, position data, activity data, temporal data, and other information useful for determining the current state or context of the user, UE 101a, one or more other UE 101n, various points-of-interest (e.g., buildings, landmarks) encountered by the user during travel. In certain instances, the metadata may be collected by one or more sensors of the UE 101a-101n for processing by the service 113, the platform 111, or a combination thereof.

In addition, the metadata may also be used to enable the identification of one or more content items that correspond to the context of the user, the UE 101, one or more other UE 101, or a combination thereof. By way of example, when it is determined the location information of the user corresponds a particular city, the location data may be used as a filter for narrowing the search for one or more content items corresponding to the city. Under this scenario, movies featuring scenes or actors related to the current city of travel of the user may be recommended or activities pertaining to the user's present locale may be established.

In one embodiment, the content item recommendation platform 111 also causes the rendering of a content item selection list in connection with user interface of the mapping application 107. By way of example, the user may select one or more content items to consume (e.g., download, stream, play) in connection with a travel route graphically represented via said user interface. Under this scenario, the content items correspond to one or more navigation elements presented as routing information based on the one or more travel routes. In addition, the platform 111 may cause the rendering of one or more icons, markers or other graphical elements for depicting relative locations, points or times of execution of the one or more content items along a given travel route. For example, a marker featuring an icon of a movie reel may be placed at a specific point along a travel route to depict a start time or end time of consumption of a selected movie. Under this scenario, the placement (location point or distance) of the marker along the travel route corresponds to the relative timing information associated with the movie. Still further, timing information may be rendered to the user interface of the mapping application in connection with the one or more content items for depicting an amount of time remaining for consumption of a content item, an amount of time remaining for completion of the travel route, a start time, an end time, or a combination thereof.

It is noted, in one embodiment, that the routing information pertaining to one or more travel routes may be presented in conjunction with the execution of a content item. For example, a movie selected for consumption may be presented in a frame or window as a data view concurrent with the user interface of the mapping application. Under this scenario, updates to the one or more travel routes, travel times, distances, content recommendations, activity recommendations, etc., are shown to correspond to a specific point of play/stoppage of the movie. As another example, specific scenes of the movie featuring a particular POI (e.g., a landmark) may be depicted to a map featuring the travel route for further depicting the relationship between the travel route and the content item being consumed.

In one embodiment, the content item recommendation platform 111 also detects a travel modality selected by a user in connection with generation of one or more travel routes. Based on the travel modality, the platform 111 can adapt and/or update the recommended content items. By way of example, the travel modality may specify a mode of transport of the user, including train transport, bus transport, car transport, pedestrian travel, or a combination thereof. In the case of a public transportation system, the content item recommendation platform 111 may also account for route scheduling information for enabling in the determining of travel times and/or the time required for consumption of a content item.

In one embodiment, the content item recommendation platform 111 also determines whether the amount of time and/or distance required to traverse a travel route exceeds a predetermined threshold. For example, the threshold may be established by the user as one or more user preferences or as a default setting (e.g., 2.5 hours). Based on this determination, the platform 111 then generates and/or recommends one break periods to associate with the travel route. The break period corresponds to a time and/or location along the travel route wherein the consumption of content items is temporality ceased—i.e., an intermission. During this intermission, various activities may be recommended to the user and the content may be resumed upon completion of the activity or at the user's discretion. It is noted that the break periods may be generated to correspond to one or more points-of-interest, rest stops, or a combination thereof. For example, in the case of train transport, the content item recommendation platform 111 may correlate a given activity recommendation with a scheduled stop at a train station at a halfway point of the trip (e.g., an advertisement for the user to visit the train snack shop).

In one embodiment, the content item and activity recommendation capabilities of the platform 111 are offered by a service provider as a managed or hosted solution. Alternatively, the content item recommendation platform 111 may be implemented for direct execution by UE 101a-101n or the mapping application 107a-107n—i.e., as a widget or in-application service. In the case where the platform 111 is integrated for local execution via UE 101, the locally executed mapping application 117 or other application requiring routing information (e.g., a word processing application that supports location based services) may provide content recommendations. For either implementation, the content item recommendation platform 111 enables any registered UE 101a-101n to integrate content item selections with routing information related to various travel routes as they use a mapping application 107a-107n or service 113. It is noted that the user may establish one or more user profile settings in connection with the registration process for affecting the interaction of the UE 101 with the platform 111, including establishing various content preferences and types, break periods, etc.

As shown in FIG. 1, the system 100 comprises a user equipment (UE) 101 having connectivity to the content item recommendation platform 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, mapping service 113, content item recommendation platform 111 and one or more data sources 109a-109n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
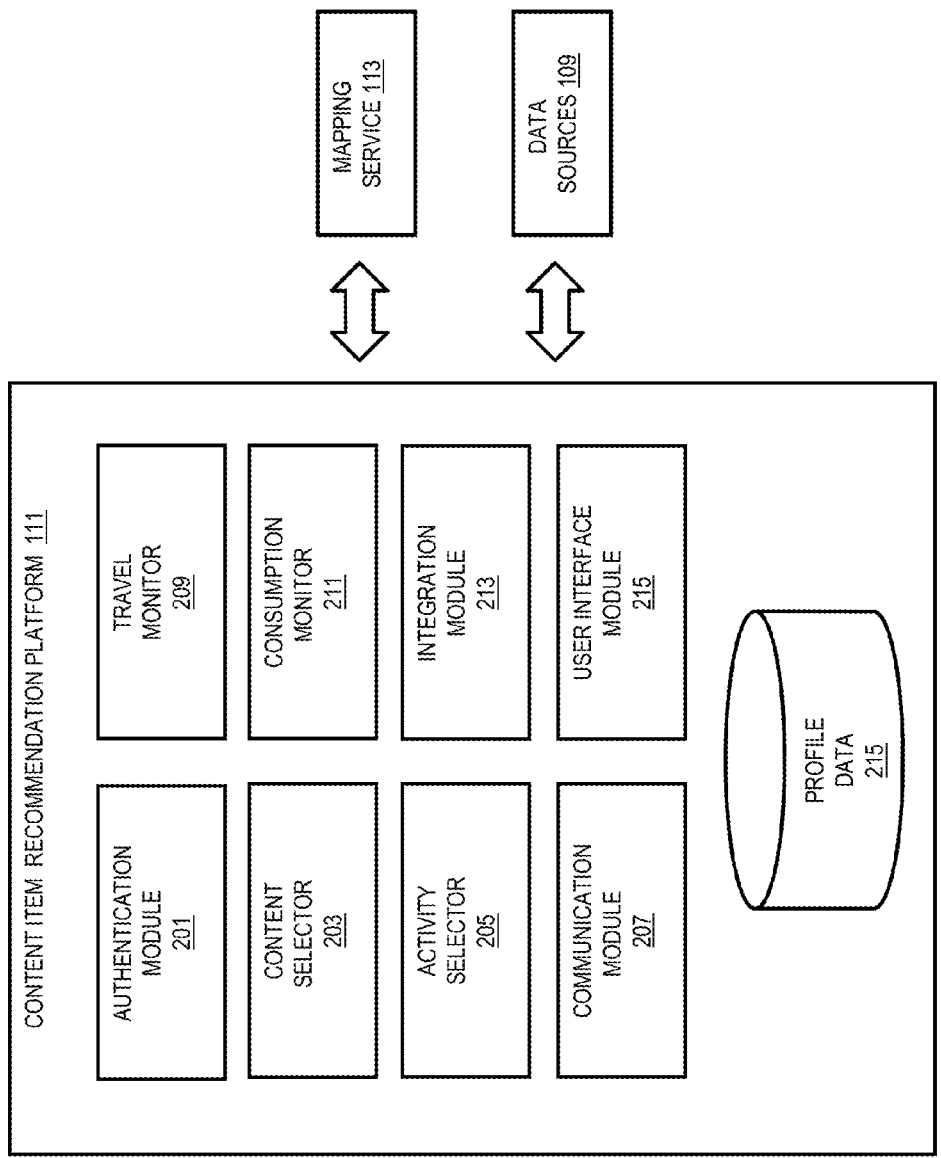
FIG. 2 is a diagram of the components of a content item recommendation platform, according to one embodiment.

FIG. 2 is a diagram of the components of a content item recommendation platform according to one embodiment. By way of example, the content item recommendation platform includes one or more components for recommending one or more content items for consumption during travel based on one or more travel times associated with one or more travel routes. It is contemplated that the functions of these components may be combined in one or more components or performed by other components of equivalent functionality. In this embodiment, the platform 111 includes an authentication module 201, a content selector 203, an activity selector 205, a communication module 207, a travel monitor 209, a consumption monitor 211, an integration module 213 and a user interface module 215.

In addition, the platform 111 accesses profile data 215 regarding one or more registered users as well as one or more data sources 109 for housing content items. In addition, the platform 111 accesses a mapping service 113 for retrieving routing information—i.e., maps, travel routes, various navigation elements—for use in connection with one or more content item recommendations.

In one embodiment, the authentication module 201 authenticates users and user devices 101a-101n for interaction with the access rights platform 111. By way of example, the authentication module 201 receives a request to generate routing information based on one or more inputs provided by a mapping application. In addition, the request corresponds to a triggering of various other modules of the platform 111 for generating one or more content item recommendations in association with the routing information. Input is received on the basis of a registered or subscribed user with the platform 111. The subscription process may include a specification of data sources 109 for accessing of various content items, including a network resource location of the data source, an access password and other credentials.

In addition, various preferences and settings information may be established, including a preferred travel mode, content category or type, default origin and destination information, etc. Content item viewing preferences may also be established for affecting how content items and/or activity recommendations are presented to the user. For example, the user may specify that content items be presented in tandem with routing information. Under this approach, the user may view their progress as they traverse a given travel route concurrent with the playing of a movie, reading of a book, viewing of a presentation, etc. In certain embodiments, the routing information may be presented within the same interface, as one or more independent data views, etc. As another example, the user may also establish a cutoff period—i.e., an amount of time a content item should end prior to arrival at a destination along a travel route. By way of example, a cutoff period may be set by the user such that movie content ends five minutes prior to an estimated arrive time. In the case of rail or bus transportation, the cutoff period may correspond to an amount of time for the user to gather their belongings in preparation for exiting the vehicle.

The authentication process performed by the module 201 may also include receiving and validating a login name and/or user identification value as provided or established for a particular user (host) during a subscription or registration process with a provider of the platform 111. The login name and/or user identification value may be received as input provided by the user from UE 101 via a graphical user interface to the platform 111 (e.g., as enabled by user interface module 207). Profile data 215 for respective subscribers may be cross referenced as part of the login process. Alternatively, the login process may be performed through automated association of profile settings maintained as registration data with an IP address, a carrier detection signal of a user device, mobile directory number (MDN), subscriber identity module (SIM) (e.g., of a SIM card), radio frequency identifier (RFID) tag or other identifier.

In one embodiment, the travel monitor 209 interacts with the mapping service 113 to maintain information regarding the current travel of the user along the one or more travel routes. By way of example, the travel monitor 209 determines a distance travelled by the user relative to their current location as well as the amount of distance remaining to reach an intermittent or final destination of the travel route. In addition, the travel monitor 209 correlates the distance information with timing information, including an approximation of an amount of time to reach the intermittent or final destination. The time and/or distance information is persistently maintained by the travel monitor 209 to enable selection of content, by the content selector 203 that is appropriate for consumption for the duration of travel. It is also noted that the travel monitor may process context information, metadata, etc., for indicating the current location and speed of the user and/or the UE 101 for approximating the timing information.

In one embodiment, the consumption monitor 211 determines a rate or amount of consumption of a selected content item during travel. The consumption is facilitated by way of a content execution application, i.e., a media player. As such, the consumption monitor 211 receives feedback from the content execution application 108 of respective UE 101 for indicating consumption. For example, in the case of a media player, the amount of consumption may correspond to the amount of time elapsed due to viewing of a movie by the user, a current time of playback of the movie, an amount of data streamed and/or viewed in connection with the movie versus a known full amount of the movie, or a combination thereof. In the case of a book reader as the content execution application 108, for example, the amount of consumption may correspond to a number of pages read or viewed by the user, a location of a bookmark, etc. It is noted that the consumption monitor 211 may interface with any context execution application 108 for monitoring consumed content items as well as determining user input for affecting consumption such as a stopping, pausing, initiating or restarting of content items and/or content streams.

The consumption monitor 211 also interacts with the travel monitor 209 to convey a consumption status of a selected content item, including a starting and/or stopping of the content. As such, the travel monitor 209 is able to maintain a consistent record of the amount of time remaining before reaching of a travel destination relative to the current consumption of the content item. For example, the travel monitor 209 interacts with the consumption monitor 211 to validate an estimated arrival time of fifty-three minutes to a destination corresponds to an equivalent amount of time required to consume the content item in full. Hence, in the case of movie content, the movie would also have fifty-three minutes remaining for full viewing assuming no cutoff period was specified by the user. In the case of a cutoff period, i.e., a ten minute cutoff, the amount of time remaining for full viewing of the movie would be forty-three minutes.

In addition, the consumption monitor 211 may trigger the updating of one or more content items recommendations by the content selector 203 based on the determined amount of time remaining before the reaching of the travel destination. For example, when it is determined the amount of time required to reach a destination is less than the amount of time remaining for full viewing of a movie, a different content item requiring less time may be recommended by the content selector 203 based on the timing information received from the consumption monitor 211. In this case, a notification message may also be generated by the user interface module 215 for display to the user for indicating that the current selected content item will exceed the estimated arrival time. The user may then opt to continue viewing of the current content item or select from the one or more updated recommendations.

In one embodiment, the content selector 203 operates in connection with the travel monitor 209 and consumption monitor 211 to determine one or more content items to be associated with a travel route. The content selector 203 carries out various functions, including for example, selecting of one or more content items to be presented and/or recommended to the user based on the timing and consumption information determined by the travel monitor and consumption monitor respectively. In addition, the content selector 203 may be configured to process content item metadata associated with a particular content item for determining a content item recommendation. The content item metadata associated may include, for example, a content format, length, size, authoring/ownership information, digital rights information, etc. In addition, the metadata may include corresponding description information, user feedback information, ratings information, usage statistics data, etc. Under this scenario, the content selector 203 processes the one or more content sources (as well as any associated content item metadata) to: (1) determine an amount of travel time required for consumption of one or more content items relative to the one or more travel routes; and (2) identify the one or more content items having or associated with a playback time that is within the amount of time for the user of the mobile device to reach the destination.

By way of this approach, the content selector 203 may determine multiple content items to recommend to the user relative to a given travel route as well as a sequence for enabling playback of the content items during travel. It is noted that the content selector 203 may operate in connection with the user interface module 215 to cause a rendering of one or more recommendations to a user interface of the mapping application 107. The integration module 205 enables the recommendations and content to be integrated for use with the mapping application 107 or service 113, including coordinating the execution of various application programming interfaces (APIs) required of the mapping application.

To facilitate the retrieval and/or referencing of content items per a recommendation, the content selector 203 also determines one or more data sources 109 associated with the user, the mobile device, or a combination thereof. The data sources 109 maintain various content items of various types. Furthermore, the data sources 109 may include those specified by the user via their profile data 215, those recommended by a service affiliated with the user (e.g., a movie streaming service), those recommended by a vendor/affiliate of the content item recommendation platform 111, those recommended by one or more social networking contacts of the user, or a combination thereof. Of note, the content items may be retrieved by the content selector 203 based on various criteria or filter settings, including content preferences of the user, permission levels, ratings criteria, contextual details (e.g., current location of the user), or a combination thereof.

The content selector 203 may also determine one or more break periods to be recommended to the user for affecting consumption of content items. The break periods may include, for example, one or more periods wherein a content item is paused, discontinued or changed based on a length of time associated with a selected travel route. Under this scenario, when it is determined the travel route exceeds a predetermined threshold, a number of break periods may be introduced accordingly. It is noted that the number or frequency of break periods may be adapted by the user based on settings indicated in their profile data 215.

Still further, in certain embodiments, the content selector 203 may also process metadata and other context data including location data or activity data, for supporting the selection of one or more content items to recommend. By way of this approach, when it is determined the user is travelling abroad, the data source 109 selected for retrieval of content may correspond to a source located in the country of travel rather than a source in the user's home country. As another example, when it is determined the user is listening to music content, the content selector 203 may access a data source 109 corresponding to a popular local radio station based on the current location of the user.

In one embodiment, the activity selector 205 determines one or more activities to recommend to the user based on the one or more travel routes, the metadata and/or context information, or a combination thereof. Activities may include, for example, one or more games, promotional offers or travel services to be taken advantage of by the user during or in association with a travel route. In addition, the activity may correspond to a point-of-interest along the travel route. In certain instances, the activity recommended may be based on an amount of travel remaining, an amount of consumption of a content item, a predetermined break period as established by the content selector 205 or an interruption/change in the travel route. As such, activities involving the user of one or more travel services or promotional items may be presented to the user after the pausing or stopping of a movie, music or other content items.

The activity selector 205 may operate in connection with the mapping service 113 and user interface module 215 to permit one or more navigation elements corresponding to the activity to be presented in connection with one or more travel routes. For example, in the case of a coupon for the purchase of food items in a dining car of an interstate train, an icon representing the food item may be presented to the display or along the travel route at a time and/or distance corresponding to the generating of the recommendation (e.g., during a break period). Still further, the activity may be presented in connection with a determined context of the user, i.e., a recommendation of a local activity based on the determined location of the user. It is noted that the activity selector 205 interacts with the travel monitor 209, consumption monitor 211 and content selector 203 to coordinate presentment of activities as content within the user interface of the mapping application 107 accordingly.

In one embodiment, a communication module 207 enables formation of a session over a network 105 between the content item recommendation platform 111 and the mapping service 113 and/or mapping application 107 of a UE 101. By way of example, the communication module 207 executes various protocols and data sharing techniques for enabling collaborative execution between a subscriber's UE 101a-101n (e.g., mobile devices, laptops, smartphones, tablet computers, desktop computers) and the platform 103 over the network 109. It is noted that the communication module 207 is also configured to support a browser session—i.e., the retrieval of content as referenced by a resource identifier during a specific period of time or usage of the browser.

In one embodiment, the user interface module 207 enables presentment of a graphical user interface for presenting the content recommendations, activity recommendations, routing information including one or more travel routes, or a combination thereof. In addition, the user interface module 207 enables generation of an interface for associating content items with a particular travel route. The user interface module 207 generates the interface in response to application programming interfaces (APIs) or other function calls corresponding to operating system of the user devices 101a-101n; thus enabling the display of graphics primitives. It is noted that user interface module 215 may operate in connection with the integration module 213 for incorporating the content items within the user interface of the mapping application, etc. By way of this approach, the user may consume content items and routing information within the same view.

Figure 6:
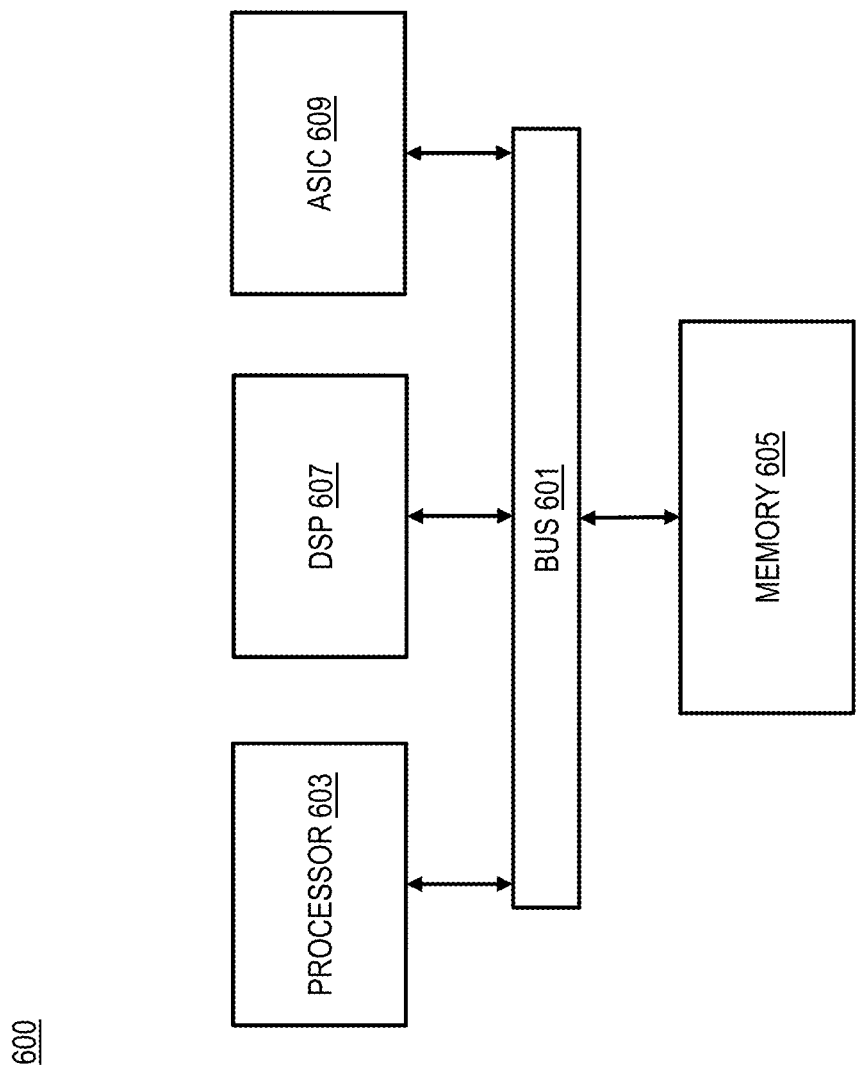
FIG. 6 is a diagram of a chip set that can be used to implement an embodiment of the invention.

FIGS. 3A-3D are flowcharts of a process for generating one or more travel routes based on experience information related to one or more users, according to various embodiments. In one embodiment, the content item recommendation platform 111 performs processes 300, 306, 316 and 324 and is implemented in, for instance, a chip set including a processor and a memory as shown in FIG. 6.

In step 301 or process 300 (FIG. 3A), the content item recommendation platform 111 determines one or more travel routes associated with at least one device and/or at least one user of the at least one device. In step 303, the platform 111 causes a recommendation of one or more content items based on one or more travel times associated with the one or more travel routes. As noted, the travel times may be determined as timing information, and may include a determining of an amount of time to travel from a point of origin to a destination point along the travel path. The timing information may be based on historical and/or average travel times, the current speed of travel of the user, or a combination thereof.

In step 305, the platform 111 causes a rendering of a user interface depicting the one or more travel routes. Still further, in step 307, the platform 111 causes a rendering of one or more portions of the one or more travel routes in the user interface to represent a respective one or more distances along the one or more routes that are traveled during one or more time periods for consuming the one or more content items. By way of example, the portion of the travel route traversed by the user relative to an amount of consumption of a content item is depicted accordingly.

In step 309 of process 308 (FIG. 3B), the content item recommendation platform 311 determines a selection of at least one of the one or more travel routes. Hence, under this scenario, the platform is made aware of a recommended content item (e.g., a movie or music item) being initiated by the user for consumption. Per step 311, the platform 111 causes an update of the one or more content items, the rendering of the user interface depicting the one or more travel routes and/or the rendering of the one or more portions of the one or more travel routes based on the selection. Still further, in step 313, the platform 111 also causes a monitoring of the one or more travel times during travel along the one or more travel routes. Per step 315, the platform 111 causes an update of the recommendation and/or another recommendation of one or more other content items based on the monitoring.

It is noted that the updating steps 311 and 315 correspond to the real-time execution and presentment capabilities of the content item recommendation platform 111. For example, by monitoring the specific items being consumed by the user in connection with current travel conditions of the user, the most relevant routing information and content is presented to the user at all times. Furthermore, a rate of consumption of a given content item during travel may be correlated directly with a speed of travel of the user, a relative distance traversed by the user along the travel route, or a combination thereof. The content item recommendation platform 111 may employ the use of various algorithms or proportional assessment methods for maintaining an accurate accounting of such relationships as well as for regulating content items recommendations based on discrepancies.

In step 317 of process 316 (FIG. 3C), the content item recommendation platform 111 determines an input for specifying the one or more content items. In step 319, the platform 111 processes one or more time periods for consuming the one or more content items to determine the one or more travel routes and/or one or more other travel routes. By way of this approach, the amount of time determined for traversing a travel route is associated with a specific time required for consumption of the content items.

In another step 321, the platform 111 determines metadata associated with the one or more travel routes and/or one or more points of interest associated with the one or more travel routes. As noted previously, the metadata may be used for determining the relevance of a location along with additional context information for the user. The one or more content items are determined based, at least in part, on the metadata. Still further, per step 323, the platform 111 causes a recommendation of one or more activities based on one or more travel times, one or more break periods and/or one or more rest stops associated with the one or more travel routes. As noted, the activities may pertain to one or more points-of-interest, one or more travel services, one or more venues, one or more incentives, or a combination thereof.

In step 325 of process 324 (FIG. 3D), the platform 111 determines a travel modality associated with the one or more travel routes. Still further, per step 327, the platform 111 causes a rendering of the one or more travel times based on the travel modality. By way of example, the travel modality may be specified by the user as train transport, bus transport, car transport, pedestrian travel, or a combination thereof. As a result of the specified travel modality, the timing information regarding a travel route may be adjusted accordingly.

It is contemplated, in certain embodiments, that the content item recommendation platform 111 may process contextual information in connection with real-time travel condition data for affecting generation of content item recommendations, routing information, or a combination thereof. For example, travel condition data may include weather data, traffic data, news data and road condition data. By way of example, real time traffic data for indicating heavy traffic build-up along a suggested route may trigger a recommending of an alternate set of content items—i.e., a longer movie due to extended travel times. As another example, the content item recommendation platform may access train or bus schedule information for use in generating timing information for use in selecting one or more content item recommendations.

FIGS. 4A-4F are diagrams of user interfaces utilized in the processes of FIGS. 3A-3D, according to various embodiments. For the purpose of illustration, the figures are discussed from the perspective of an exemplary use case of a user accessing a mapping service via a browser application 400. Under this scenario, the user is traveling abroad in Germany according to varying travel modalities and wishes to identify one or more content items they can enjoy/consume as they navigate a selected travel route 403.

Figure 4A:
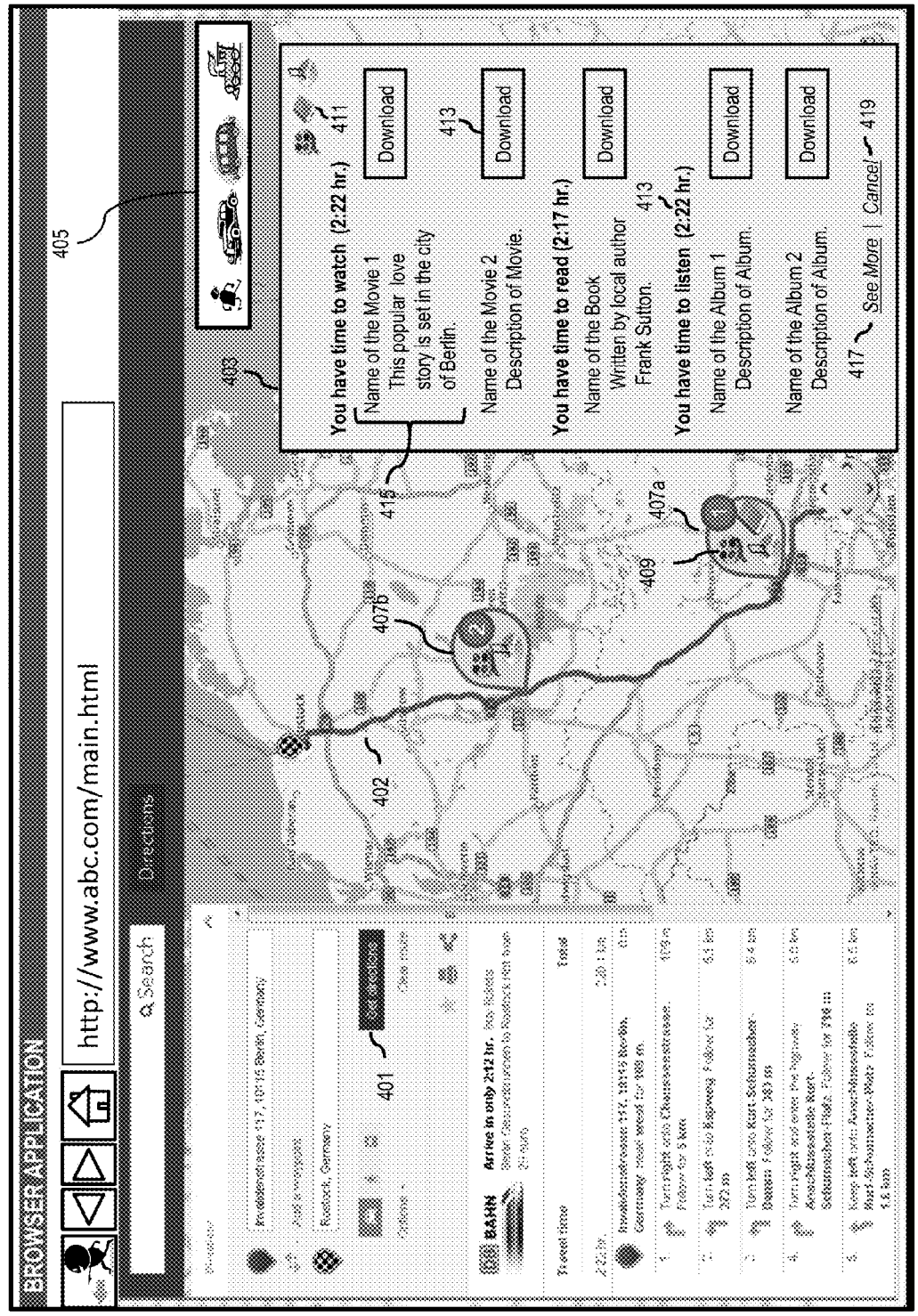
FIGS. 4A-4F are diagrams of user interfaces utilized in the processes of FIGS. 3A-3D, according to various embodiments.

In FIG. 4A, routing information including at least one travel route 402 is presented to the user interface 400 in response to activation of the mapping application and/or service—i.e., based on selection of the Get Directions action button 401. As a result, the content item recommendation platform 111 processes the input provided by the user (e.g., the destination location or origin location), context information as gathered by the UE 101 of the user, or a combination thereof to determine timing information. For example, the platform 111 may determine a travel modality selection option 405 of the user corresponds to that of car transport. Also, the platform 111 may determine the time of day corresponds to a heavy traffic period, that the user is presently located in Germany based on geospatial data, and that the user prefers science fiction related content based on the established subscription/user preferences. Based on this, as well as computed timing information, the platform 111 renders one or more content item recommendations via a selections window 403.

Under this scenario, the selections window 403 indicates the various content items determined to be consumed within the amount of time required for travel via the travel route 402. For instance, a content item corresponding to a movie 415 is presented to include the name of the movie and a brief description of the movie. Due to processing of context information and/or relevant metadata, content item 415 is described as being a movie that is related to the city of travel of the user (Berlin). Similar information is presented for other types of content, which include a digital book and one or more music albums featuring various audio content items. The user may select a particular item to activate and/or download by way of a Download action button 413, which initiates accessing of the content from a data source 109. Of note, each content item type is preceded by a message for indicating an amount of time, i.e., time 413, available to the user for consuming the data relative to the travel time required. The amount of time required for consumption of the content item will generally be less than or equal to the amount of time required to complete the travel route 402 unless otherwise specified by the user.

It is noted, in certain instances, that the rate of consumption of certain content types may vary. For example, in the case of content that is to be read, the amount of time required to read the book may vary from one user to the next. Also, in the case of content requiring direct user input or stimulus, such as gaming related content or trivia content (e.g., crossword puzzles, Sudoku) the time required for a user to enjoy the content will vary depending on their skill level, familiarity, etc. In such cases, the content item recommendation platform 111 may recommend these types of content items based on feedback information provided by others regarding the content or based on an average time of use/consumption as gathered over time.

For example, feedback information by other users may indicate a particular book as being consumed in whole or in part in four hours' time. This feedback information may be conveyed to the provider of the data source 109 by prior readers of the book and subsequently conveyed as metadata—i.e., in conjunction with the description of the content (e.g., "Most users reported reading chapters 1-6 of this book in 2 hours' time."). Similarly, usage statistics regarding an online game for indicating an average completion time of 2 hours may be collected by the game provider and thus presented in association with the content as it is retrieved from a data source 109. Under this scenario, the content item recommendation platform 111 processes the statistic information—i.e., via the content selector 203—in deriving a content item recommendation. It is noted that the content item recommendation platform 111 may also render, subsequent to consumption of a particular content item, an interface for gathering feedback from the user regarding a particular content item. This may be prompted by the platform 111 upon completion of the content item, during a break point, at the end of the travel route, etc., and subsequently provided to the provider of the selected content item.

The selections window 403 also features one or more filter option buttons, such as button 411, for restricting the list of recommended content items to a specific type of content. For example, while the selection window 403 of FIG. 4A shows all content item recommendation types, the user may select the book filter 411 to view only book content item recommendations. Still further, one or more links 417 and 419 may be selected to enable further actions to be performed, including expanding the list to present more content item recommendation or cancelling the selections window altogether.

Also presented are one or more markers for specifying a distance and/or time associated travel of the user along the travel route 402. By way of example, a first marker 407a corresponds to where a proposed or selected movie or other content item would or could start playing. A second marker 407b corresponds to where a second proposed or selected movie or other content would or could start playing. Under this scenario, the entire time required to complete the travel route is associated with at least two content items to be consumed. The user may further optimize their selections accordingly based on additional recommendations. It is noted that the markers 407a and 407b are placed along the travel route in accordance with an estimated distance traversed by the user relative to the point of play of the movies. Also, placement (location point or distance) of the marker along the travel route corresponds to the relative timing information associated with the movie.

In addition, the platform 111 may cause the rendering of one or more icons or other graphical elements in connection with a marker 407a and 407b. For example, marker 407a features icons of a movie reel 409 for indicating movie content may be viewed. In addition, an icon of a book and music note may be presented to indicate book content and musical content is available as well. As depicted, the book icon is only shown in connection with the first marker 407a it corresponds to the only book recommendation presented. Hence, only one book content item is determined to be recommended for consumption as it features enough pages, graphics, etc., for review by the user along the travel route.

Figure 4B:
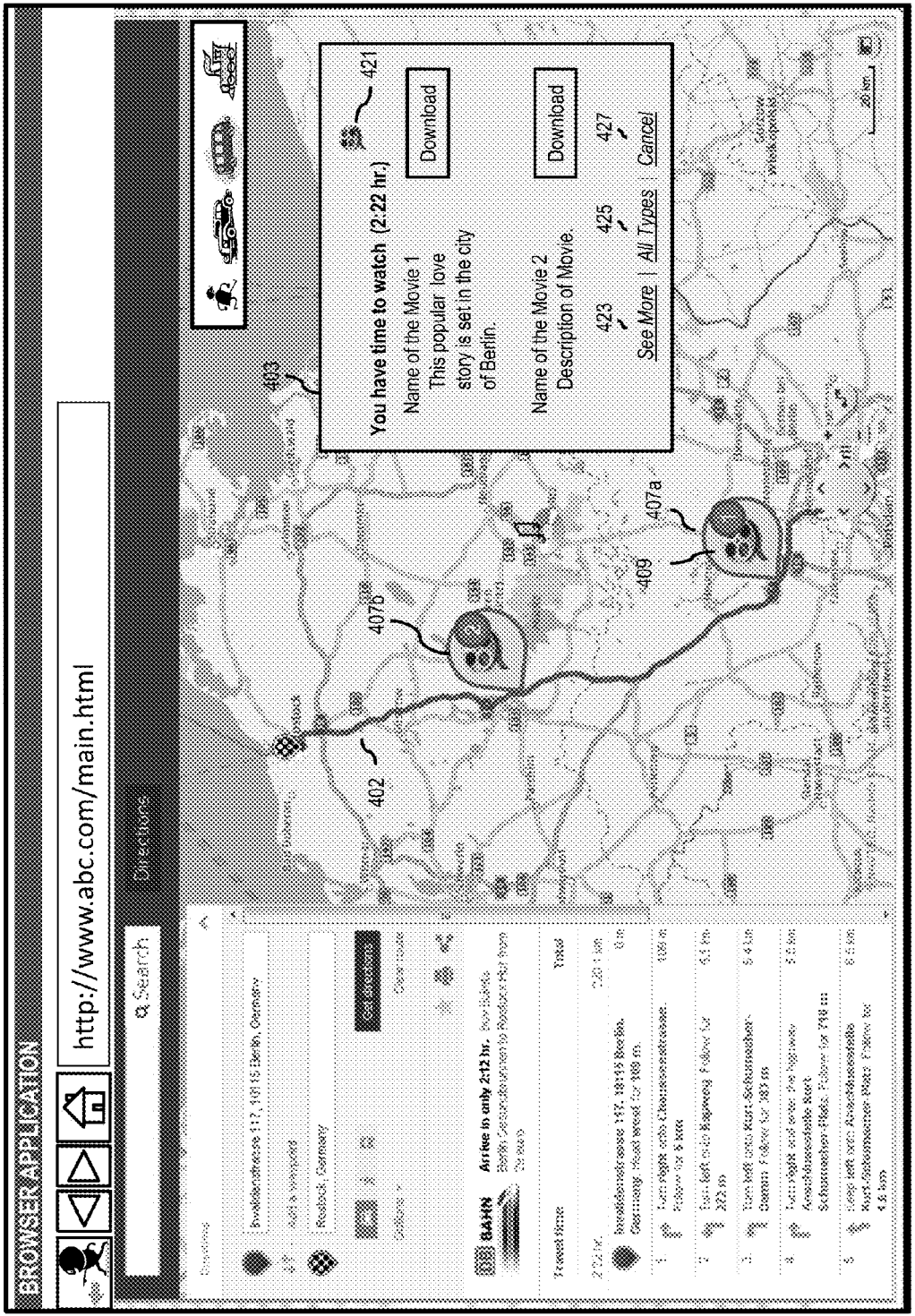

In FIG. 4B, the selections window 403 is shown when filtered to present only movie related content items. This is based on activation of a movie items filter button 421. As a result, only movie icons (e.g., icon 409) are shown in connection with the markers 407a and 407b. Also, the user is presented with various links to enable further actions to be performed. This includes, for example, a See More link 423 for expanding the number of movie content item selections presented in the selection window 403. Also, an All Types link 425 causes presentment of all content types recommended by the platform 111 (e.g., unfiltered as in FIG. 4A). Still further, a Cancel link 427 may be selected to cancel the selection window.

Figure 4C:
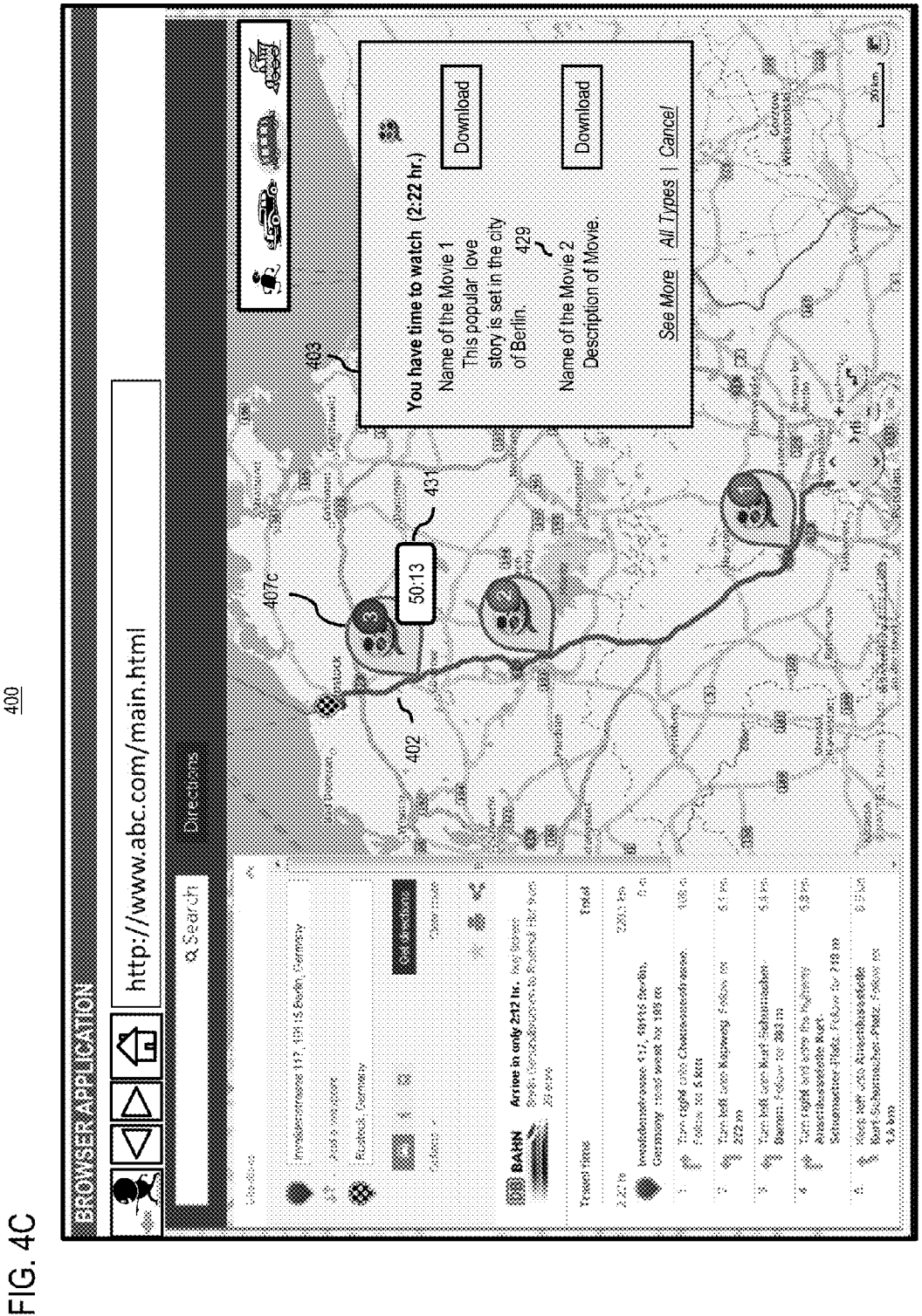

In FIG. 4C, a third marker 407c is presented along the travel route 402. The third marker 407c marks where the second selected movie 429 (or other content item) would stops playing or stop. Under this scenario, the content may be stopped due to a predetermined break or as a result of full consumption of the content (e.g., the movie ends). As depicted, the movie is set to stop prior to completion of the entire travel route 402. As a result, the content item recommendation platform 111 operates in connection with the mapping application to render a timing indicator 431. The timing indicator 431 indicates how much time is left for travel after the movie ends. During this time, the user may opt to select more content items to consume or may re-select previously viewed content. As per execution of the integration module 213, the indicator 431 may be dynamic and thus subject to change as the user travels about the travel route 402.

In other instances, the user may place a mouse cursor over the proposed movie for causing display of the timing information. It is noted that timing information may be rendered to the user interface of the mapping application in connection with the one or more content items for depicting an amount of time remaining for consumption of a content item, an amount of time remaining for completion of the travel route, a start time, an end time, or a combination thereof.

Figure 4D:
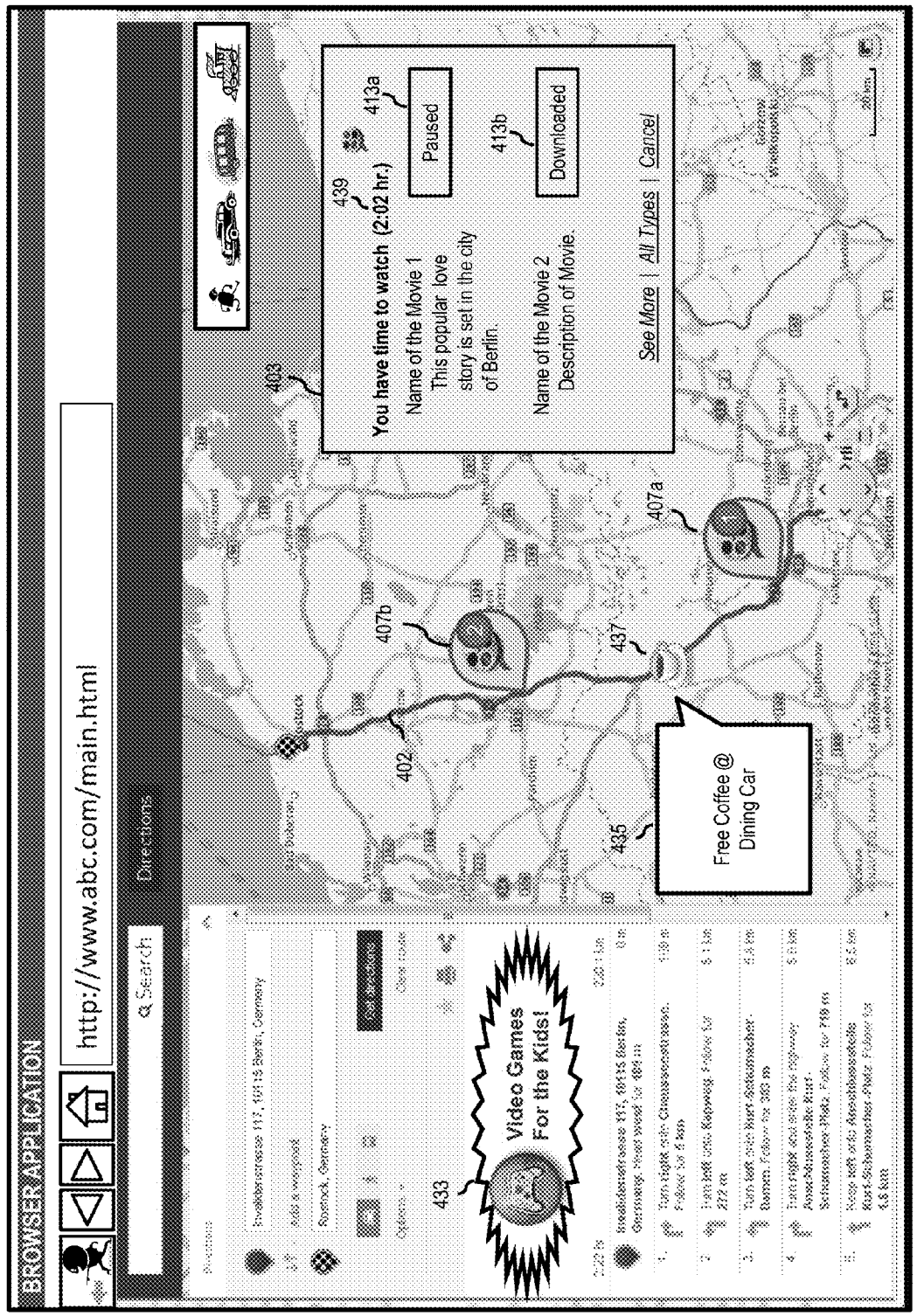

In FIG. 4D, a break period icon 437 is presented to the user interface 400 to represent a relative time and/or distance along the travel route for a break period to occur. In this example, the travel modality is indicated as train travel. Resultantly, the timing information is adjusted to accommodate this modality, i.e., a different travel time 439 is depicted in connection with the one or more content item recommendation 403. Also, the status of the action buttons 413 within the selection window 403 are adapted as a result of the user having started consumption of one or more of the movie items, i.e., time elapsed since the location of the first marker 407a. By way of example, action button 413a indicates the movie is in a Paused state, such as due to the occurrence of the break period. Another action button 413b indicates the second movie has been downloaded and is queued for execution at a point and time corresponding to the second marker 407b.

As noted previously, the break period may be automatically established by the platform 111 in response to a determination of a predetermined (overall) time travel threshold being determined. Alternatively, the user may specify a time period for the occurrence of one or more break periods. In certain instances, the break period may also correspond to the generation of one or more activity recommendations. A first recommendation includes, for example, an offer for the user to enjoy free coffee in the dining car of the train. A second recommendation 433 includes a link for advertising one or more online video games that may be enjoyed by children travelling with the user. In the latter scenario, the recommendation is generated based on profile data for the user that indicates they have children or as a result of input to the mapping application for indicating the presence of children on the trip. Hence, as noted previously, the platform 111 may propose contextually relevant content, wherein the context is based on the user, the travel route, the UE 101, the travel provider, or the like.

Figure 4E:
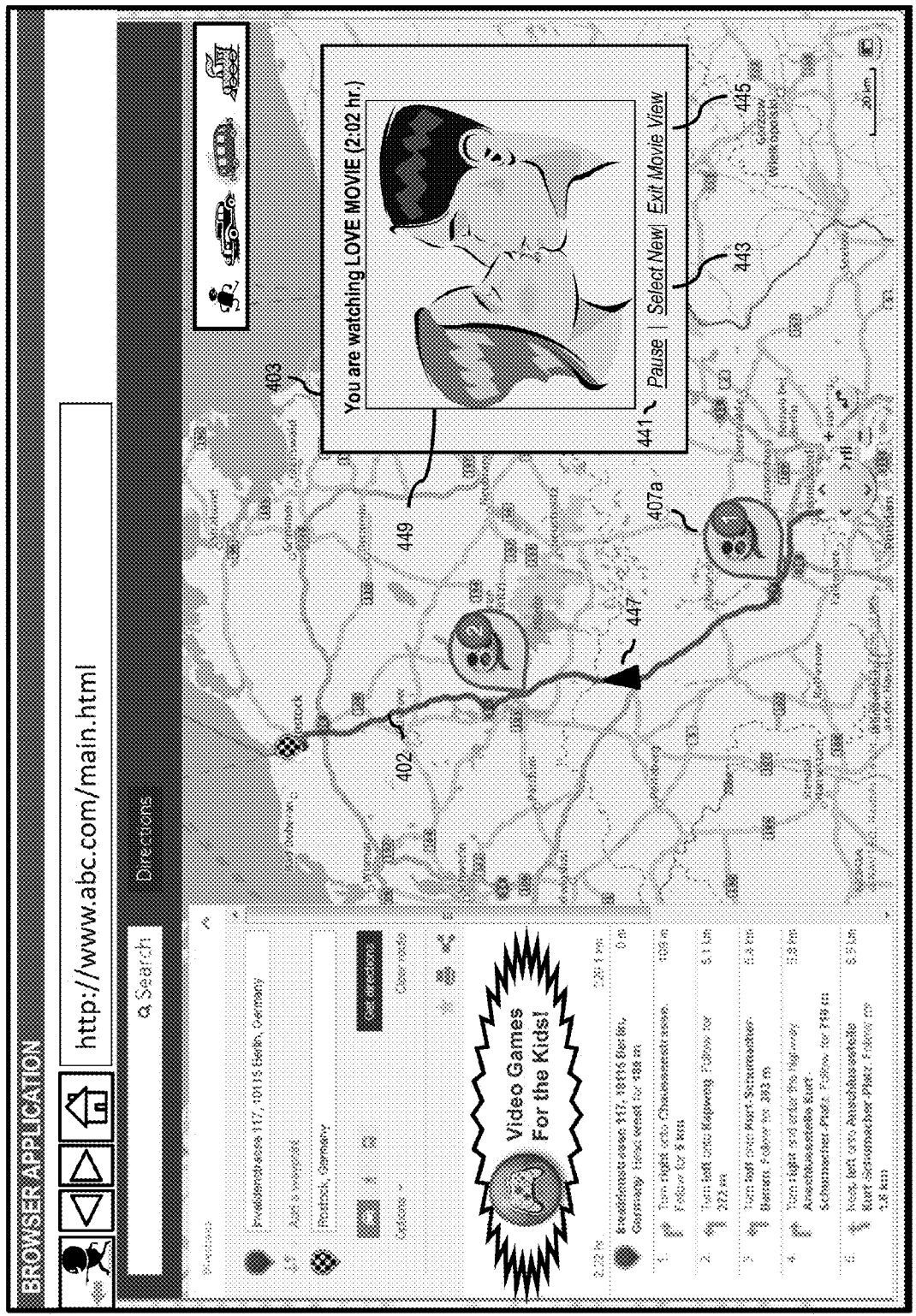
Figure 4F:
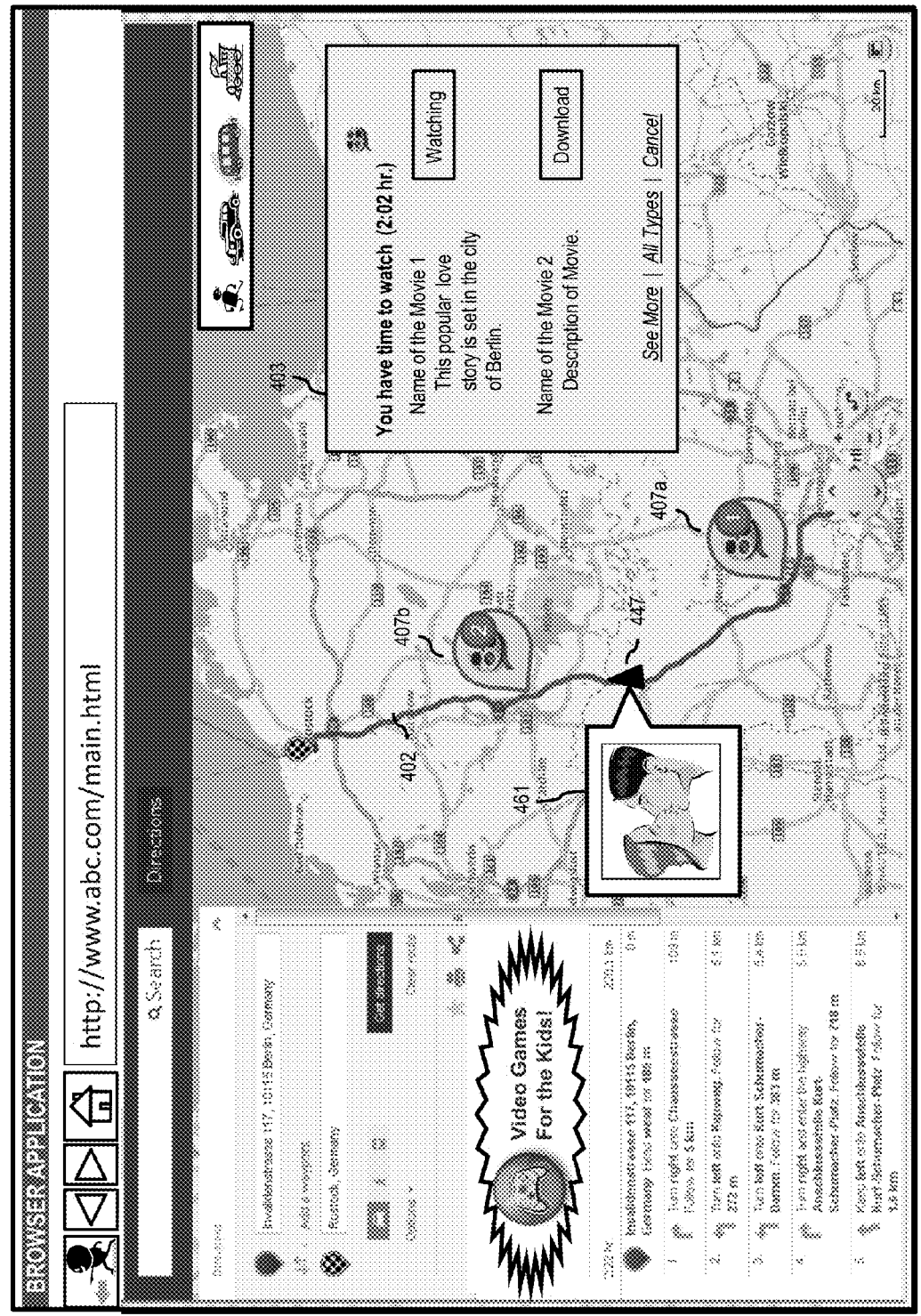

In FIGS. 4E and 4F, a movie 449 is shown to be displayed within the user interface 400 of the mapping application concurrent with the display of routing information. In FIG. 4E, the movie is rendered to the selections window 403 and corresponds to the first movie of the list—i.e., corresponding to the first marker 407a. The user has the option of pausing the movie 449 by selecting a Pause link 441, selecting a different movie to view (e.g., skipping to the second movie recommended by the platform 111) by selecting a Select New link 443 or exiting from the movie by selecting an Exit Movie View link 445. It is noted that upon selection of link 445, the selection window 403 resorts to presenting movie content item recommendations in the manner shown in FIGS. 4B-4D. A location marker 447 for representing the current location of the user along the travel route 402 may also be dynamically updated concurrent with execution of the movie 449.

In FIG. 4F, the movie is rendered as a thumbnail view 451 that extends from or references the location marker 457. In this scenario, the thumbnail view 451 is dynamically updated concurrent with updates to the placement of the location marker 447. For example, as the user proceeds further along the travel route 402 as detected via global positioning system tracking, the marker 447 is updated accordingly. Consequently, the movie content displayed via the thumbnail view 461 is depicted as moving across the user interface 400 in the same manner—i.e., at the same rate or pace as the marker 447.

By way of this approach, the movie appears to the user as dynamically moving content concurrent with real-time changes in the position and location of the user due to movement of the train. In the case where the speed of the train increases, for example, the marker 447 would be shown to traverse the travel route 402 at a greater pace as would the thumbnail view 461. Similarly, the increased speed reduces the amount of time required to reach an intermediate of final destination of the travel route 402. Resultantly, the location of the second marker 407b may be adjusted to reflect this change in travel time. Furthermore, the user may be presented with additional content item recommendations that correspond to the newly determined timing information. It is noted that dynamic adjusting as described herein may be limited to specific conditions being determined, such as a determination that the amount of travel time is reduced or increased by a specific threshold (e.g., more than 10 minutes compromised).

It is contemplated, in one embodiment, that a change in direction of the user during travel along a recommended travel route 402 may also affect how content items are consumed during travel. For example, when it is detected that the user changes direction to proceed away from the travel destination, the content item recommendation platform 111 causes the movie 449 shown in FIG. 4E to stop or rewind commensurate with the speed and distance of travel of the user. Alternatively, the movie may be paused and queued to resume at the same point it left off once the user comes back to the appropriate point along the travel route 402. These features may be chosen at the discretion of the user and established via the content viewing preferences of their profile data.

The processes described herein for generating one or more travel routes based on experience information related to one or more travelers may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
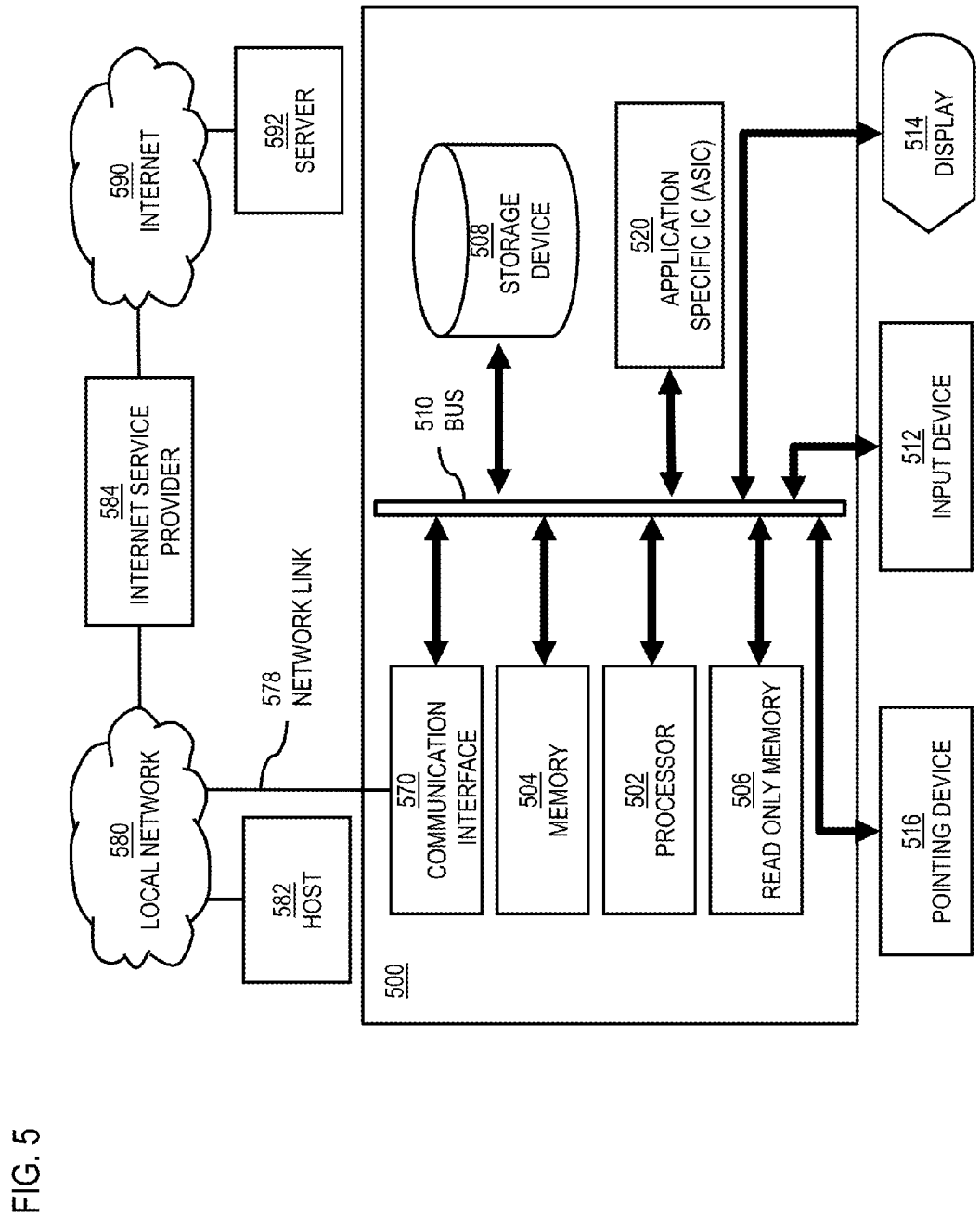
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to recommend one or more content items for consumption during travel based on one or more travel times associated with one or more travel routes as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit).

Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of recommending one or more content items for consumption during travel based on one or more travel times associated with one or more travel routes.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to recommend one or more content items for consumption during travel based on one or more travel times associated with one or more travel routes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for recommending one or more content items for consumption during travel based on one or more travel times associated with one or more travel routes. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for recommending one or more content items for consumption during travel based on one or more travel times associated with one or more travel routes, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for recommending one or more content items for consumption during travel based on one or more travel times associated with one or more travel routes to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to recommend one or more content items for consumption during travel based on one or more travel times associated with one or more travel routes as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of recommending one or more content items for consumption during travel based on one or more travel times associated with one or more travel routes.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading.

The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to recommend one or more content items for consumption during travel based on one or more travel times associated with one or more travel routes. The memory 605 also stores the data associated with or generated by the execution of the inventive steps.

Figure 7:
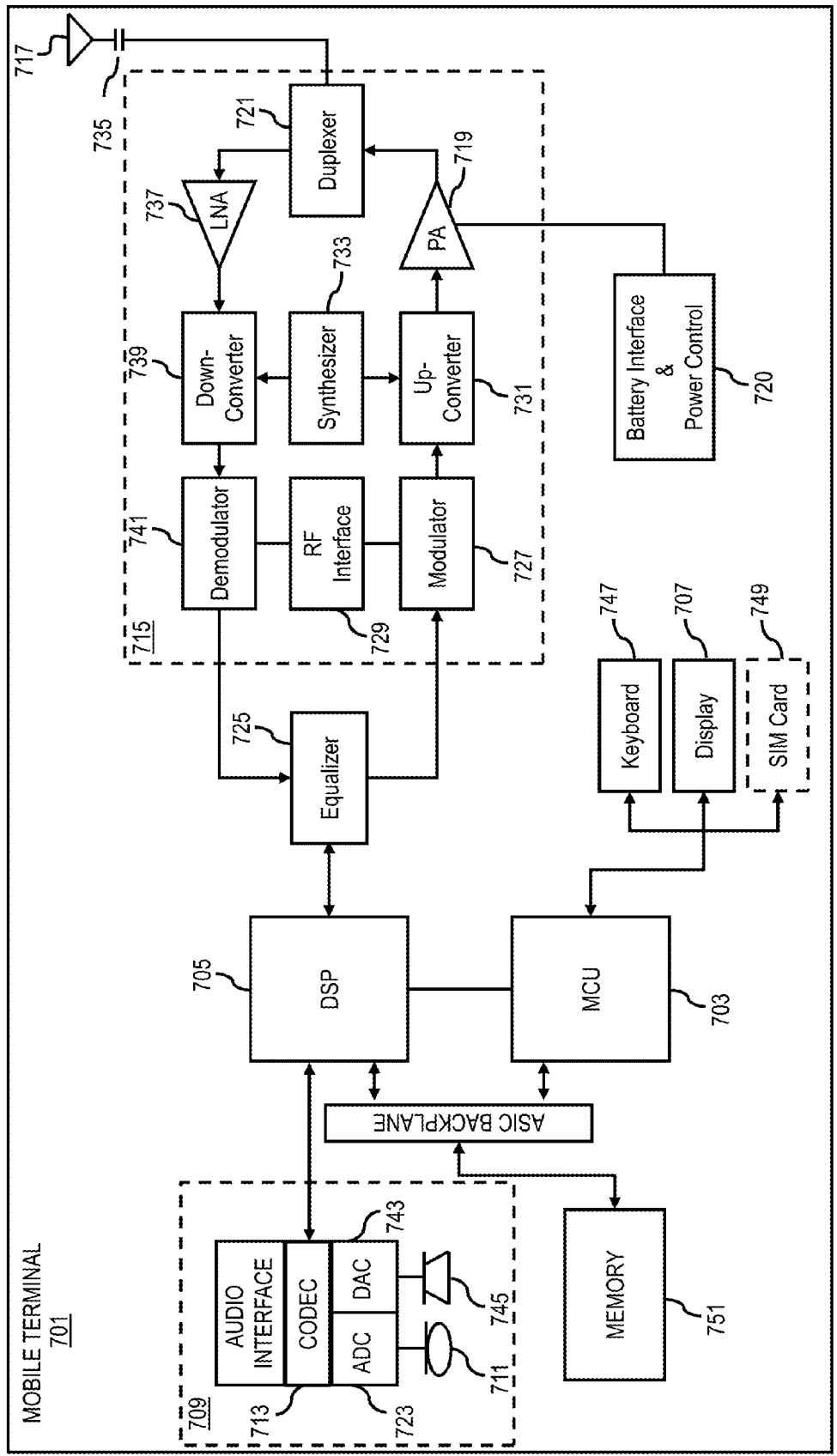
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of recommending one or more content items for consumption during travel based on one or more travel times associated with one or more travel routes. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of recommending one or more content items for consumption during travel based on one or more travel times associated with one or more travel routes. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to recommend one or more content items for consumption during travel based on one or more travel times associated with one or more travel routes. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a processor travel time associated with a travel route;
   comparing a duration of each of a plurality of electronic media content items with the determined travel time using the processor, wherein the electronic media content items include movies, music, multimedia, electronic books, or a combination thereof;
   determining, using processor, an electronic media content recommendations based on the comparison of the travel time and each of the plurality of duration times associated with the electronic media content items; and
   dynamically displaying on a display a user selectable icon, a marker, a graphical element, or a combination thereof associated with the determined electronic media content recommendations, based on an amount of time remaining to reach the destination along with a graphical representation of the travel route.

2. The method of claim 1, wherein the duration times include a start time, a stop time, a time period for consuming the electronic media content items, or a combination thereof.

3. The method of claim 1, comprising:
   updating the rendering of the icon, the marker, the graphical element, or a combination thereof along the travel route in the user interface based on a monitoring of the travel time during travel along the one or more travel route.

4. The method of claim 1, comprising:
   updating the rendering in substantially real-time, periodically, according to a schedule, on demand, or a combination thereof.

5. The method of claim 1, comprising:
   rendering the travel time, the duration times, or a combination thereof in the user interface concurrently with the travel route.

6. The method of claim 1, comprising:
   rendering the electronic media content items and the travel route concurrently in the user interface.

7. The method of claim 1, comprising:
   determining the electronic media content items from a private, a public, a permission based data source that houses the various content items via a communication network, or a combination thereof.

8. The method of claim 1, comprising:
   determining activities recommendations based on the travel time, the travel route, or a combination thereof; and
   rendering the icon, the marker, the graphical element, or a combination thereof in the user interface along the travel route based on the activities recommendations.

9. The method of claim 1, comprising:
   rendering of updates of the travel route, the travel time, the duration time, the electronic media content recommendation, the electronic media content items, the activities recommendations, or a combination thereof based on the start time, the stop time, or a combination thereof of the electronic media content items.

10. The method of claim 1, comprising:
    determining metadata associated with the electronic media content items related to a point of interest along the travel route; and
    rendering a portion of the electronic media content item in the user interface along the travel route based on the metadata, the travel route, the point of interest, or a combination thereof.

* * * * *